United States Patent

[11] 3,615,204

| [72] | Inventors | John J. Libera<br>Affton;<br>Eckard J. Puetz, Lemay, both of Mo. |
|---|---|---|
| [21] | Appl. No. | 860,015 |
| [22] | Filed | Sept. 22, 1969 |
| [45] | Patented | Oct. 26, 1971 |
| [73] | Assignee | NL Industries, Inc.<br>New York, N.Y. |

[54] PREPARATION OF ANATASE TITANIUM DIOXIDE PIGMENT
4 Claims, No Drawings

[52] U.S. Cl. .................................................. 23/202 R,
23/117, 23/126, 106/300
[51] Int. Cl. ................................................. C01g 23/06,
C01g 23/08
[50] Field of Search .......................................... 23/202,
117, 126; 106/300

[56] References Cited
UNITED STATES PATENTS

| 2,516,548 | 7/1950 | Cauwenberg ............... | 23/202 R |
| 2,817,595 | 12/1957 | Kalinowski .................. | 23/202 R X |
| 2,886,415 | 5/1959 | Aagaard ...................... | 23/202 R |
| 2,999,011 | 9/1961 | Olmsted et al. .............. | 23/202 R |
| 3,062,673 | 11/1962 | Wigginton ................... | 23/202 R X |
| 3,071,439 | 1/1963 | Solomka ...................... | 23/202 R |
| 3,091,515 | 5/1963 | Dantro et al. ................ | 23/202 R |
| 3,337,300 | 8/1967 | Hughes ........................ | 23/202 R |
| 3,403,977 | 10/1968 | Heywood et al. ............ | 23/202 R |
| 3,518,053 | 6/1970 | Kolznak et al. .............. | 23/202 R |

Primary Examiner—Edward Stern
Attorneys—Charles F. Kaegebehn, Robert L. Lehman and Robert L. Holiday ABSTRACT: This invention relates in general to a process for preparing a high-quality titanium dioxide pigment in which the titanium dioxide is in the anatase crystal form. The process comprises hydrolyzing in a particular manner the titanium values from a titanium sulfate-ferrous sulfate solution in which the concentration of titanium is from 80 to 180 g.p.l. $TiO_2$ and the $FeSO_4/TiO_2$ ratio is from 2.20 to 2.75 and treating and calcining the hydrate so formed to produce a high-grade anatase $TiO_2$ pigment. Using the hydrolysis process of the instant invention, a high-grade anatase titanium dioxide pigment may be produced from a solution which does not require the conventional crystallization step to remove most of the iron values and the concentration step to increase the titanium content in the liquor to at least 200 g.p.l. $TiO_2$.

PREPARATION OF ANATASE TITANIUM DIOXIDE PIGMENT

BACKGROUND OF THE INVENTION

Titanium dioxide pigments are generally produced commercially according to the prior art processes by the so-called "sulfate process" in which a titaniferous material, such as a titaniferous iron ore, ore concentrate or a titanium slag is heated at elevated temperatures, with concentrated sulfuric acid to form a porous cake, sometimes referred to in the art as "digestion cake." The digestion cake is allowed to cure so as to effect maximum recoveries of titanium values upon dissolving. After curing the cake is dissolved in water or weak acid, with agitation to form a solution of titanium sulfate and iron sulfates. The ferric sulfate values in the solution are converted to ferrous sulfate by the addition, to the solution, of a reducing agent, such as scrap iron with or without antimony oxide. The solution is then clarified by settling and filtration to remove all of the solid material contained in the solution with minimum loss of $TiO_2$.

Following clarification the solution is then usually subjected to a crystallization step to remove most of the ferrous sulfate values as copperas, i.e., $FeSO_4 \cdot 7H_2O$.

After crystallization the titanium sulfate solution is subjected to concentration to remove water from the solution. This is accomplished by evaporation in concentrators which operate under vacuum and at elevated temperatures. Concentration is continued until the specific gravity of the solution is at least 1.5 with a $TiO_2$ content of at least 200 grams per liter and preferably from 250–300 grams per liter.

The concentrated titanium sulfate solution is then converted by hydrolysis, from the soluble state into insoluble $TiO_2$ hydrate and in general this change is effected through dilution of the concentrated titanium sulfate-ferrous sulfate solution with $H_2O$ at elevated temperatures. Thus a predetermined amount of titanium sulfate-ferrous sulfate solution having a $TiO_2$ content of at least 200 grams per liter is preheated at a temperature of at least 90° C. and added at a predetermined rate, with agitation, to clear water at substantially the same temperature and in the ratio of 3–19 parts solution to one part water. During subsequent boiling, the precipitated $TiO_2$ forms initially as colloidal particles, which subsequently floc to produce a filterable $TiO_2$ hydrate containing from 30 percent to 36 percent solids.

High-quality titanium dioxide pigments may be produced from this particular type of prior art hydrate when the hydrate is produced from a concentrated and crystallized titanium sulfate solution.

This particular prior art hydrolysis procedure is unsatisfactory to employ however when an unconcentrated and uncrystallized titanium sulfate-ferrous sulfate solution is used.

SUMMARY OF THE INVENTION

A high-quality titanium dioxide pigment having the crystal structure of anatase may be produced by the process of the instant invention which utilizes a hydrolysis procedure which employs a titanium sulfate-ferrous sulfate solution having a titanium concentration from 80 to 180 g.p.l. $TiO_2$, a $FeSO_4/TiO_2$ ratio from 2.20 to 2.75 and a $H_2SO_4/TiO_2$ ratio from 1.70 to 2.30.

The process comprises the following steps:

1. add a measured quantity of the above clarified, uncrystallized and unconcentrated titanium sulfate-ferrous sulfate solution to an empty precipitation tank. The temperature of the solution should be from 40° to 70° C.;
2. add to the above solution a separately prepared nucleating agent. The amount of said nucleating agent employed may be from 0.5 to 2.0 percent calculated as $TiO_2$ and based on the weight of the $TiO_2$ to be precipitated. The solids content of said nucleating agent may be from 12 to 16 percent, said solids containing from 85 to 89% $TiO_2$ and 11 to 15% $Na_2O$, the mole proportions of $TiO_2:Na_2O$ being from 5.7–8.1:1.0;
3. the addition of (1) and (2) being carried out with agitation in the precipitation tank and;
4. after the addition period heating the mixture to boiling temperature within 20 minutes to 70 minutes;
5. boil gently the mixture from one-half to 4 hours;
6. filter and thoroughly wash the precipitated titanium hydrate;
7. bleach the washed hydrate to reduce the ferric iron values to the ferrous state, and after filtering and washing;
8. add water to form a titanium hydrate slurry;
9. treat the slurry with salts of potassium and phosphorous in amount equivalent to 0.3–0.5% $K_2O$ and 0.4–0.8% $P_2O_5$ on a $TiO_2$ weight basis, the mole proportions of $K_2O:P_2O_5$ being from 0.9–1.3:1.0;
10. calcine the dewatered slurry at temperature between 850° and 1,000° C. to form anatase $TiO_2$ having a spectral characteristic of at least 2.5;
11. and milling the calciner discharge to form said anatase pigment.

DESCRIPTION OF THE PREFERRED EMBODIMENT

The preferred embodiment of the invention comprises utilizing the hydrolysis procedure described above wherein the nucleating agent is prepared as follows:

a. a washed titanium hydrate previously prepared is admixed with water to form a slurry having a solid content from 20 to 26 percent and a temperature of 25° to 70° C.;
b. 50 percent solution of NaOH at 25° to 50° C. is reacted with the above slurry in quantities sufficient to have an $NaOH/TiO_2$ ratio of 1.5 to 1.7;
c. with agitation the mixture is held for 1 to 2 hours with the temperature held between 80° and 92° C.;
d. after holding for 1 hour the slurry is cut to 10 to 15 percent solids by the addition of water;
e. the slurry is then filtered and washed thoroughly with water;
f. the washed filter cake is then repulped to form an aqueous slurry of 12 to 16 percent solids.

Another method for preparing the nuclei is presented as follows:

the nucleating agent is prepared by forming a titanium hydrate slurry having a solids content of from 20–26 percent and heating said slurry to a temperature of 85–95° C., adding said heated slurry to a solution of NaOH heated to 95–100° C., the amount of said NaOH being sufficient to obtain a $NaOH/TiO_2$ ratio of 1.5–1.7, said heated slurry added to said NaOH over a period of 15–20 minutes to obtain a temperature of 115–120° C., the reaction mixture being held at temperature from 80–95° C. for 2 hours to cure said mixture, adding water to reduce the solids content to 10–15 percent, filtering, washing, and repulping to form an aqueous slurry having a solids content from 12–16 percent.

All percentages and ratios referred to in this case are based on weights except where they are indicated as mole proportions.

Using the instant hydrolysis process when hydrolyzing an uncrystallized, unconcentrated solution, the titanium hydrate formed apparently possesses the necessary crystallite and floc sizes so that upon treatment and calcination the anatase $TiO_2$ pigment formed possesses superior pigment properties.

In this process the separately prepared seed or nucleating agent is prepared in advance. It may be stored for future use and because small portions of it are used from batch to batch, a more uniform hydrolysis product may be produced.

The pigment properties were determined as follows:

The tinting strength was determined by the well-known Reynolds' Tinting Strength Method as described in Physical and Chemical Examination of Paints, Varnishes, Lacquers, and Colors, by H. V. Gardner, Ninth Edition, May 1939, page 37.

The color brightness and tone were determined by the following methods:

COLOR BRIGHTNESS AND TONE OF PIGMENT.

This test determined instrumentally the brightness and tone of the titanium dioxide pigment in a wet film of alkyd vehicle. The pigment was dispersed in a soya alkyd vehicle and the green, red and blue reflectance values of the wet film were measured. The green reflectance value was taken as a measurement of the brightness of the pigment and the blue minus red reflectance values as a measure of the color tone. The determinations were made on a Colormaster Differential Colorimeter manufactured by Manufacturers Engineering and Equipment Corp., Hatboro, Pa.

REFLECTANCE OF THE PIGMENT

The pigment was mixed with a soya alkyd resin to form a paste and the paste was applied to the surface of a high-reflectance white ceramic panel, the thickness of the paste film being sufficient to eliminate the background color. The green, red and blue reflectance values of the film were read on the Colormaster and the reflectances were recorded as percent reflectance.

The spectral characteristics of the pigment was determined as follows:

SPECTRAL CHARACTERISTICS OF PIGMENT IN A PAINT VEHICLE

The pigment was mixed with a soya alkyd vehicle containing carbon black and the mixture was formed into a paste. The ratio of the pigment to carbon black present in the paste was 5 to 0.15. The paste was then spread onto a lacquered sheet and the wet film was immediately tested in the Colormaster Colorimeter described above. The blue and red reflectance values were obtained. The spectral characteristic of the pigment was measured by comparing the result obtained by subtracting the red from the blue reflectance values and comparing this result with the spectral characteristics of a standard pigment previously determined.

In order to described more fully the process of the instant invention, the following examples are presented:

EXAMPLE 1

A sodium titanate nuclei was prepared as follows:
a. a previously prepared titanium hydrate which had been thoroughly washed and bleached was used as the source of titanium. Water was added to the titanium hydrate to prepare a slurry having a 23 percent solids content. This slurry was held at room temperature until used to prepare the sodium titanate material;
b. sufficient 50% NaOH solution, also at room temperature, to give $NaOH/TiO_2 =1.60$ was then added with agitation to the hydrate slurry at a uniform rate over a period of about 15 minutes. Peak temperature during reaction was 58° C.;
c. the resulting mixture was then heated to 89° C. and allowed to cure at this temperature for 1 hour;
d. the sodium titanate slurry was then diluted with a volume of water equal to about one-third of the slurry volume;
e. the sodium titanate was then filtered and washed with warm water until the filtrate was free of sulfate ion when tested with $BaCl_2$ solution. The washed cake was then added to water to obtain a sodium titanate slurry of about 15 percent solids.

A clarified, uncrystallized, unconcentrated solution of titanium sulfate-ferrous sulfate was used in this hydrolysis procedure. The solution has the following analysis:

| | |
|---|---|
| $TiO_2$ (%) | 8.51 |
| $H_2SO_4$(%) (to methyl orange) | 15.9 |
| $H_2SO_4/TiO_2$ | 1.87 |
| $FeSO_4/TiO_2$ | 2.44 |

The precipitation was carried out as follows:

1. sodium titanate slurry at room temperature was added in 10 seconds to 2000 ml. sulfate solution at 55° C. with agitation;
2. an additional 2,000 ml. sulfate solution was then added;
3. the amount of sodium titanate employed was 0.75% calculated as $TiO_2$ on the basis of the $TiO_2$ content of the total sulfate solution (4,000 ml.) and the sodium titanate slurry;
4. the mixture was then heated to boil over a period of 15 minutes and boiled for 1 hour;
5. 500 ml. of $H_2O$ was added to the precipitation batch and agitation was continued for about 5 minutes without heating;
6. the batch was then diluted with water to about 10 liters and allowed to settle overnight;
7. the liquor was removed and the hydrate was washed and bleached thoroughly to remove the iron and other coloring impurities.

In this particular example the iron in the hydrate was reduced to 0.003% $Fe_2O_3$ which is below the upper limit of 0.005% $Fe_2O_3$.

The washed and bleached hydrate was then slurried with water to obtain 30 percent solids. The slurry was then treated with 0.34 % $K_2O$ (added as KOH solution) and 0.40% $P_2O_5$ (added as $H_3PO_4$) the percentages based on the amounts retained in the hydrate and based on the weight of $TiO_2$ in the slurry. After agitating the treated slurry for 1 hour the slurry was filtered and the treated hydrate was introduced into the calciner.

The hydrate was calcined for 100 minutes at 940° C. after which the calcined $TiO_2$ was thoroughly milled. The milled pigment had the following properties:

| | |
|---|---|
| % Reflectance | 95.9 |
| Tone | −3.6 |
| Reynolds Tinting Strength | 1,275 |
| Spectral Characteristic | 3.1 |

EXAMPLES 2–3

In examples 2 and 3, the same procedure described in example 1 was employed except that in these instances the amount of sodium titanate slurry added to the sulfate solution was 0.5 and 1.0 percent respectively.

EXAMPLES 4–5

In examples 4 and 5, the procedure described in example 1 was employed except for preparing the sodium titanate nuclei. The sodium titanate nuclei for these examples were prepared as follows:

1. a previously prepared titanium hydrate which has been thoroughly washed and bleached was used as the source of titanium. Water was added to the titanium hydrate to prepare a slurry having a 23 percent solids content. The hydrate slurry was heated to 85° C. and agitated.
2. the heated hydrate was added to sufficient 50% NaOH solution at 100° C. to give $NaOH/TiO_2$=Slurry addition time was 18 to 19 minutes.
3. the desired temperature during the reaction of hydrate and NaOH was obtained by external heat. In example 4, this temperature was 120° C. while in example 5, it was 113° C.
4. after hydrate addition, the sodium titanate slurry was allowed to cool to 90° C. and held at this temperature for a total cure time of 2 hours.
5. after curing the processing of the sodium titanate nuclei was identical to that of example 1.

EXAMPLE 6

In example 6, the same procedure described in example 1 was employed for the preparation of the sodium titanate nuclei except that the slurry of previously prepared titanium hydrate and water was heated to 60° C. with live steam before the addition of the caustic soda solution also at 60° C. In example 1, both the titanium hydrate slurry and the caustic soda solution were at room temperature. The $NaOH/TiO_2$ was 1.57 instead of 1.60.

The hydrolysis procedure differed somewhat and was as follows:

1. 2,000 cu. ft. of this solution were added to a precipitation tank over a period of 31 minutes.
2. simultaneously with the addition of the titanium solution, 29 cu. ft. of sodium titanate slurry were added also to the precipitation tank during the 31 minute addition period, the temperature being within the range of 50° to 65° C. during and after the addition period.
3. the amount of sodium titanate employed was 1.7 percent calculated as $TiO_2$ and based on the weight of the $TiO_2$ in the hydrate.
4. steam was added to the mixture during the addition period so that the mixture came to a boil in 60 minutes after the addition was completed.
5. the mixture was then boiled for 2 hours after which the precipitation was allowed to settle, the liquor removed and the hydrate was washed and bleached thoroughly to remove the iron and other coloring impurities.
6. the washed and bleached hydrate was then processed as was example 1, except that the washed and bleached hydrate was treated with 0.45 % $K_2O$ and 0.65% $P_2O$ stead of 0.34% $K_2O$ and 0.40% $P_2O_5$.

EXAMPLES 7–8

In these examples the procedure of example 6 was used except that the precalcination treatments were reduced below the lower limits contemplated by the instant invention. The results are recorded in table I and they clearly show that the tinting strengths and spectral characteristics are reduced considerably.

TABLE I

| Solution | Examples | | | |
|---|---|---|---|---|
| | 1 | 2 | 3 | 4 |
| $TiO_2$, % | 8.51 | 8.46 | 8.46 | 8.27 |
| gpl. | 131 | 129 | 129 | 127 |
| $H_2SO_4$ | 15.9 | 15.5 | 15.5 | 14.7 |
| $H_2SO_4/TiO_2$ | 1.87 | 1.83 | 1.83 | 1.78 |
| $FeSO_4/TiO_2$ | 2.44 | 2.43 | 2.43 | 2.49 |
| Nuclei | | | | |
| Peak temp. during reaction °C. | 58 | 58 | 58 | 120 |
| Cure temp. °C. | 89 | 89 | 89 | 90 |
| Cure time, hrs. | 1 | 1 | 1 | 2 |
| $NaOH/TiO_2$ | 1.60 | 1.60 | 1.60 | 1.60 |
| Hydrolysis | | | | |
| Nuclei added, % | hrs. | 0.5 | 1.0 | 0.75 |
| Boil time, hrs. | 1 | 1 | 1 | 1 |
| Treatment | | | | |
| $K_2O$, % | 0.34 | 0.34 | 0.34 | 0.34 |
| $P_2O_5$, % | 0.40 | 0.40 | 0.40 | 0.40 |
| Calcination | | | | |
| Temperature, °C. | 940 | 940 | 940 | 940 |
| Time, minutes | 100 | 100 | 100 | 100 |
| Pigment Properties | | | | |
| Reflectance, % | 95.9 | 95.9 | 96.0 | 95.8 |
| Tone | −3.6 | −3.7 | −3.7 | −4.0 |
| Reynolds Tinting Strength | 1,250 | 1,200 | 1,250 | 1,250 |
| Spectral Characteristics | 3.1 | 3.4 | 3.2 | 3.3 |

Table I—Continued

| Solution | Examples | | | |
|---|---|---|---|---|
| | 5 | 6 | 7 | 8 |
| $TiO_2$, % | 8.36 | 8.01 | 8.01 | 8.01 |
| gpl. | 128 | 123 | 123 | 123 |
| $H_2SO_4$ | 15.08 | 15.6 | 15.6 | 15.6 |
| $H_2SO_4/TiO_2$ | 1.80 | 1.95 | 1.95 | 1.95 |
| $FeSO_4/TiO_2$ | 2.41 | 2.46 | 2.46 | 2.46 |
| Nuclei | | | | |
| Peak temp. during reaction °C. | 113 | 92 | 92 | 92 |
| Cure temp. °C. | 90 | 90 | 90 | 90 |
| Cure time, hrs. | 2 | 1 | 1 | 1 |
| $NaOH/TiO_2$ | 1.60 | 1.57 | 1.57 | 1.57 |
| Hydrolysis | | | | |
| Nuclei added, % | 0.75 | 1.7 | 1.7 | 1.7 |
| Boil time, hrs. | 1 | 2 | 2 | 2 |
| Treatment | | | | |
| $K_2O$, % | 0.34 | 0.45 | 0.18 | 0.20 |
| $P_2O_5$, % | 0.40 | 0.65 | 0.30 | 0.25 |
| Calcination | | | | |
| Temperature, °C. | 940 | 940 | 940 | 940 |
| Time, minutes | 100 | 100 | 100 | 100 |
| Pigment Properties | | | | |
| Refelctance, % | 96.0 | 95.7 | 94.0 | 95.0 |
| Tone | −4.0 | −4.0 | −4.7 | −4.2 |
| Reynolds Tinting Strength | 1,250 | 1,275 | <1,000 | 1,000 |
| Spectral Characteristics | 3.2 | 2.8 | 1.2 | 2.5 |

While this invention has been described and illustrated by the examples shown, it is not intended to be strictly limited thereto, and other variations and modifications may be employed within the scope of the following claims.

1. A method for producing a high-quality titanium dioxide pigment having the crystal structure of anatase which comprises providing a clarified, uncrystallized and unconcentrated titanium sulfate-ferrous sulfate solution at a temperature of 40°–70 C. said solution having a titanium concentration from 80 to 180 g.p.l. $TiO_2$, a $FeSO_4/TiO_2$ ratio from 2.20 to 2.75 and a $H_2SO_4/TiO_2$ ratio from 1.70 to 2.30, adding said solution to a precipitation tank, adding to said solution with agitation a separately prepared nucleating agent, the amount of said nucleating agent employed being from 0.5 to 2.0 percent calculated as $TiO_2$ and based on the weight of the $TiO_2$ to be precipitated, the solids content in said nucleating agent being from 12 to 16 percent, said solids containing from 85 to 89% $TiO_2$, and 11 to 15% $Na_2O$, the mole proportions of $TiO_2:Na_2O$ being from 5.7–8.1:1.0, after the addition period heating the mixture to boiling temperature within 20 minutes to 60 minutes, boiling gently the mixture from one-half to 4 hours, filtering and thoroughly washing the precipitated titanium hydrate, bleaching the washed hydrate to reduce the ferric iron values to the ferrous state, and after filtering and washing, adding water to form a titanium hydrate slurry, treating the slurry with salts of potassium and phosphorous in amount equivalent to 0.3–0.5% $K_2O$ and 0.4–0.8% $P_2O_5$ on a $TiO_2$ weight basis, the mole proportions of $K_2O:P_2O_5$ being from 0.9–1.3B1.0, calcining the dewatered slurry to form anatase $TiO_2$ having a spectral characteristic of at least 2.5, and milling the calciner discharge to form said anatase pigment.

2. Method according to claim 1 in which the nucleating agent employed is prepared by forming a titanium hydrate slurry having a solids content of from 20–26 percent and a temperature of 25°–70° C., reacting with said slurry a solution of NaOH at 25°–50° C., the amount of said NaOH being sufficient to obtain a $NaOH/TiO_2$ ratio of 1.5–1.7, holding with agitation the mixture for 1–2 hours at temperature between 80°–92 C., adding water to reduce the solids content to 10–15 percent, filtering, washing and repulping to form an aqueous slurry having a solids content from 12–16 percent.

3. Method according to claim 1 in which the nucleating agent employed is prepared by forming a titanium hydrate slurry having a solids content of from 20–26 percent and heating said slurry to a temperature of 85°–95° C., adding said heated slurry to a solution of NaOH heated to 95°–100° C., the amount of said NaOH being sufficient to obtain a $NaOH/TiO_2$ ratio of 1.5–1.7, said heated slurry added to said NaOH over a period of 15–20 minutes to obtain a temperature of 115°–120° C., the reaction mixture being held at temperature from 80°–95 C., for 2 hours to cure said mixture, adding water to reduce the solids content to 10–15 percent, filtering, washing and repulping to form an aqueous slurry having a solids content from 12–16 percent.

4. A method for producing a high-quality titanium dioxide pigment having the crystal structure of anatase which comprises providing a clarified, uncrystallized and unconcentrated titanium sulfate-ferrous sulfate solution at a temperature of 40°–70 C. said solution having a titanium concentration from 80 to 180 g.p.l. $TiO_2$, a $FeSO_4/TiO_2$ ratio from 2.20 to 2.75 and a $H_2SO_4/TiO_2$ ratio from 1.70 to 2.30, providing a separately prepared nucleating agent, the amount of said nucleating agent employed being from 0.5 to 2.0% calculated as $TiO_2$ and based on the weight of the $TiO_2$ to be precipitated, the solids content in said nucleating agent being from 12 percent to 16 percent, said solids containing from 85 to 89% $TiO_2$, and 11 to 15% $Na_2O$, the mole proportions of $TiO_2:Na_2O$ being from 5.7–8.1:adding simultaneously said solution and said nucleating agent with agitation over a period of from 20–60 minutes to a precipitation tank, after the addition period heating the mixture to boiling temperature within 20 minutes to 60 minutes, boiling gently the mixture from one-half to 4 hours, filtering and thoroughly washing the precipitated titanium hydrate, bleaching the washed hydrate to reduce the ferric iron values to the ferrous state, and after filtering and washing, adding water to form a titanium hydrate slurry, treating the slurry with salts of potassium and phosphorous in amount equivalent to 0.3–0.5% $K_2O$ and 0.4–0.8% $P_2O_5$ on a $TiO_2$ weight basis, the mole proportions of $K_2O:P_2O_5$ being from 0.9–1.3:calcining the dewatered slurry to form anatase $TiO_2$ having a spectral characteristic of at least 2.5, and milling the calciner discharge to form said anatase pigment.